United States Patent [19]
Klaus et al.

[11] Patent Number: 5,316,073
[45] Date of Patent: May 31, 1994

[54] TWINNING CONTROL

[75] Inventors: J. Michael Klaus, Watertown; Marvin A. Lucas, Milwaukee, both of Wis.

[73] Assignee: Johnson Service Company, Milwaukee, Wis.

[21] Appl. No.: 41,706

[22] Filed: Apr. 2, 1993

[51] Int. Cl.$^5$ .............................................. F25B 7/00
[52] U.S. Cl. ..................................... 165/11.1; 62/175; 236/1 EA; 236/11
[58] Field of Search .................... 236/11, 1 EA, 1 ER; 62/175; 165/11.1

[56] References Cited

U.S. PATENT DOCUMENTS

| | | | |
|---|---|---|---|
| 3,059,448 | 10/1962 | McGrath | 62/175 X |
| 4,075,864 | 2/1978 | Schrader | 62/180 |
| 4,081,691 | 3/1978 | Evalds et al. | 236/1 EA |
| 4,916,913 | 4/1990 | Narikiyo | 62/175 |
| 5,062,409 | 11/1991 | Kamanaka et al. | 126/99 R |

*Primary Examiner*—William E. Wayner
*Attorney, Agent, or Firm*—Foley & Lardner

[57] ABSTRACT

A twinning controller or control circuit for use in an HVAC system is coupled between a system thermostat and at least two HVAC units coupled to a common duct. The HVAC units are heating, cooling or heating and cooling appliances such as heating furnaces, air conditioners, fans, other forced air systems, or other devices for heating and/or cooling an environment. The twinning controller is capable of operating in a single-stage mode (single mode) or a double-stage mode (dual mode). When operating in the double-stage mode, the twinning controller alternately operates the first HVAC unit and the second HVAC unit in order to extend the operating life of the HVAC units. The twinning controller includes a microcomputer which receives inputs from the system thermostat and provides outputs to the first and second HVAC units in order to efficiently control the temperature in an environment such as a living space. The twinning control includes LED indicators which provide fault codes and blower sense inputs for receiving signals indicative of the status of blowers in the HVAC units.

23 Claims, 3 Drawing Sheets

TWINNING CONTROL

FIELD OF THE INVENTION

The present invention relates generally to controllers used in temperature controlling systems such as HVAC (heating, ventilating, air-conditioning) systems. More specifically, the invention relates to an interface such as a twinning control for controlling the operation of two heating/cooling appliances such as HVAC units.

BACKGROUND OF THE INVENTION

In an HVAC system, controllers or control circuits are coupled between a system thermostat and a heating or cooling device. The controller receives signals from the system thermostat and controls the heating or cooling device in response to the signals from the system thermostats. The controller turns the devices ON and OFF in response to the signals from the system thermostat in order to provide a comfortable temperature regulated environment.

A heating or cooling device or appliance is an HVAC unit. An HVAC unit is any device for providing heating, cooling and/or air circulation. Examples of HVAC units are furnaces for providing hot air, air conditioners for providing cool air, fans for providing air circulation, or other environmental control appliances such as boilers. Preferably, the HVAC unit is a forced air system which is capable of both heating and cooling the environment.

In a forced air system, an air handler (blower, plenums and associated ductwork) moves air from the interior of the HVAC unit to the temperature regulated environment. The air handler may be used with heating and/or cooling units where energy is provided by electricity, gas, oil, as well as other fuels. The blower of the air handler generally includes a fan which is turned by an electric motor. In a forced air system such as a heating furnace, the blower forces hot air produced by a gas flame or electric coil to the environment. In a forced air system such as an air conditioner, the blower forces cool air produced by cooling coils and a compressor to the environment.

The blower in the air handler often is automatically turned ON when the HVAC unit is turned ON. Most HVAC units include start-up controls which do not turn ON the motor in the blower immediately after the HVAC unit is turned ON. These start-up controls delay the operation of the blower for a predetermined time or until a specific temperature is reached within the HVAC unit. The blower may also be turned ON by providing an external blower signal to the HVAC unit. Turning the blower ON with an external blower signal is referred to as forcing the blower ON. Proper blower operation is critical to effective HVAC unit operation because operating a HVAC unit with a malfunctioning blower may cause damage to the HVAC unit and waste energy.

Medium-sized buildings and rooms such as store fronts, light commercial buildings, or other facilities are generally heated and cooled by a number of small HVAC units operating in parallel because HVAC units of today have smaller heating and cooling capacities. Although smaller HVAC units tend to be more efficient, operating these HVAC units in parallel creates special problems. For example, HVAC units of today are generally controlled by individual thermostats. Operating multiple HVAC units with individual thermostats does not allow cooperation and integration of the individual thermostats and HVAC units.

Therefore, there is a need for a twinning control which can control the operation of two or more HVAC units. Controlling two or more HVAC units with a single twinning control allows more effective heating and cooling, superior fault detection, and more dependable HVAC unit operation, as well as backup operation. Further, a twinning control which allows single mode operation or dual mode operation provides superior flexibility in the HVAC system.

SUMMARY OF THE INVENTION

The present invention relates to a twinning control for use in a temperature controlling system. The temperature controlling system includes a system thermostat, a plurality of blower sense circuits including a first blower sense circuit and a second blower sense circuit, and a plurality of HVAC units including a first HVAC unit including a first blower unit and a second HVAC unit including a second blower unit. The first blower sense circuit is coupled to the first blower, and the second blower sense circuit is coupled to the second blower. The twinning control includes a system thermostat input means for receiving first stage heating and second stage heating input signals, first blower sense input means for receiving a first blower signal from the first blower sense circuit, second blower sense input means for receiving a second blower signal from the second blower sense circuit, first output means for providing a first HVAC unit signal for the first signal, second output means for providing a second HVAC unit signal for the second HVAC unit, and a computer means. The computer means generates the first and the second HVAC unit signals in response to the first and the second blower signals and the first and second stage heating input signals.

The present invention also provides a method of two-stage HVAC unit control in a temperature controlling system. The temperature controlling system includes a system thermostat having a high output and a low output, a plurality of blower sense circuits including a first blower sense circuit and a second blower sense circuit, and a plurality of HVAC units including a first HVAC unit including a first blower and a second HVAC unit including a second blower. The system also includes a twinning control for controlling the first and second HVAC units. The method includes the steps of turning the first and the second HVAC units ON in response to the high and low signals of the system thermostat, and turning the second HVAC unit OFF in response to an absence of the high signal. The present invention also provides that the method may turn the second HVAC unit ON in response to the high signal, and turn the first unit OFF in response to the absence of the high signal.

The present invention also provides a twinning control for use in a temperature controlling system including a system thermostat, a plurality of HVAC units including a first HVAC unit and a second HVAC unit. The twinning control includes a stage input which receives a stage signal representing a dual mode or a single mode, a system thermostat input, a first output which provides a first HVAC unit signal, a second output which provides a second HVAC unit signal, and a logic circuit. The system thermostat input receives a system thermostat signal which is comprised of either a high and a low signal in the dual mode or a single thermostat signal in the single mode. The logic circuit is coupled to the stage input, the first output and the second output. The logic circuit provides the first and second HVAC unit signals in response to the high and low signal and provides one of the first and second HVAC unit signals in response to a low HVAC unit signal and an absence of the high HVAC unit signal when in the dual mode. The logic circuit also provides the first and second output signals in response to a single system thermostat signal when in the single mode.

The present invention also provides a method for controlling first and second HVAC units in a temperature controlling system. The temperature controlling system includes a first HVAC unit having a first blower, a second HVAC unit having a second blower, a first blower sense circuit coupled to the first blower which provides a first blower ON signal, and a second blower sense circuit coupled to the second blower which provides a second blower ON signal. The system also includes a twinning control which provides a first HVAC unit signal for turning ON the first HVAC unit, a second HVAC unit signal for turning ON the second HVAC unit, a first blower signal for forcing ON the first blower, and a second blower signal for forcing ON the second blower. The method comprises the steps of providing the first and second HVAC unit signals, and providing at least one of the first and second blower signals if the first and second blower ON signals are not sensed within a first predetermined time.

Further objects and features of the present invention will be apparent from the following specification and claims when considered in connection with the accompanying drawings illustrating the preferred embodiment of the invention.

BRIEF DESCRIPTION OF THE DRAWINGS

A preferred exemplary embodiment of a twinning control in accordance with the present invention will hereinafter be described in conjunction with the appended drawings wherein like designations denote like elements in the various figures, and.

DETAILED DESCRIPTION OF A PREFERRED EXEMPLARY EMBODIMENT

The Twinning Control

Figure 1:
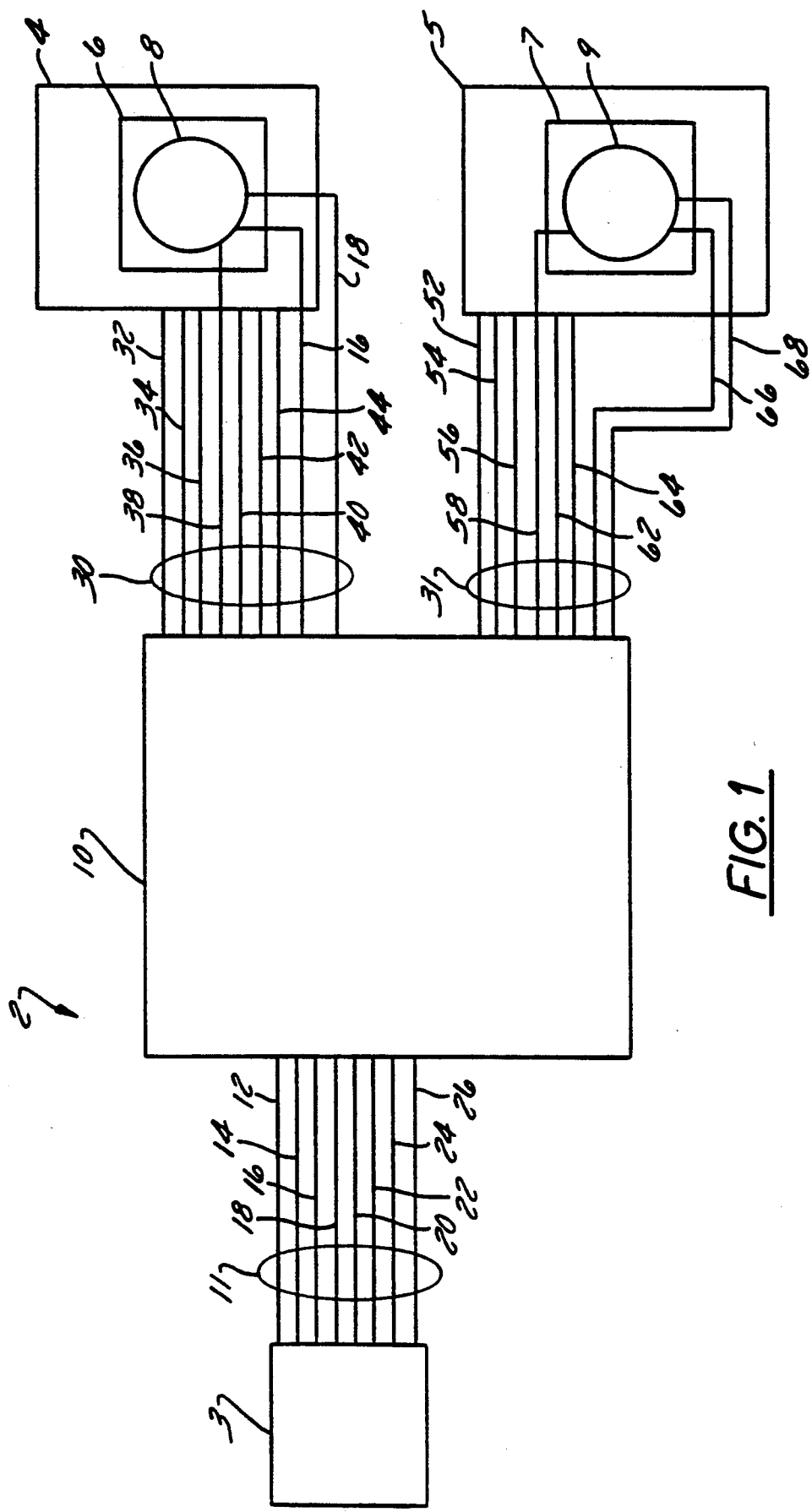
FIG. 1 is a block diagram of an exemplary twinning control employed in an HVAC system.

FIG. 1 is a block diagram of a control 10 employed in an HVAC system 2. The control 10 receives signals from a system thermostat 3 at system thermostat terminals 11. The control 10 controls an HVAC unit 4 and an HVAC unit 5 in accordance with the signals at the system thermostat terminals 11 in order to heat or cool a temperature controlled space such as a room or rooms of a building. The control 10 may be used to control any number of HVAC units; however, the description of the control 10 is as a twinning control which provides signals to HVAC unit 4 at HVAC unit control terminals 30 and to HVAC unit 5 at HVAC unit control terminals 31.

The control 10 provides an interface between the system thermostat 3 and the HVAC units 4 and 5. The control 10 may also include communication ports (not shown) for receiving data from other appliances or other controls (not shown). The control 10 utilizes the data to more effectively control the HVAC units 4 and 5.

HVAC unit 4 includes a blower 6 which includes a fan 8, and the HVAC unit 5 includes a blower 7 which includes a fan 9. The fan 8 forces air out of the HVAC unit 4 and into the temperature controlled space, and the fan 9 forces air out of the HVAC unit 5 and into the space. Preferably, the HVAC units 4 and 5 are coupled to a common duct (not shown).

The HVAC units 4 and 5 may be a heating, cooling, air-conditioning, or other temperature control device. Preferably, the HVAC units 4 and 5 include both heating and cooling devices. The interconnection between the HVAC units 4 and 5 and the HVAC unit control terminals 30 and 31, respectively, are well known in the art.

The system thermostat terminals 11 on the control 10 include a 24 V terminal 12, a heat input 14, a heat input 16, a cool input 18, a cool input 20, and a manual fan input 22 for coupling to the system thermostat 3. HVAC unit control terminals 30 on the control 10 include a 24 volt terminal 32, a heat output 34, a cool output 36, a fan output 38, a ground terminal 40, an LED terminal 42, an LED terminal 44, a blower sense terminal 46, and a blower sense terminal 48 for coupling to the HVAC unit 4. HVAC unit control terminals 31 on the control 10 include a 24 volt terminal 52, a heat output 54, a cool output 56, a fan output 58, an LED terminal 62, an LED terminal 64, a blower sense terminal 66, and a blower sense terminal 68 for coupling to the HVAC unit 5. The control 10 also includes an alarm terminal 24 and an alarm terminal 25.

Preferably, the system thermostat 3 is a single-stage or dual-stage thermostat located in the temperature controlled space. A single-stage thermostat provides a single system thermostat signal when the temperature is above a threshold level during cooling operations. In heating operations, the single-stage thermostat provides a single system thermostat signal at the heat input 14 and the heat input 16 when the temperature is below a threshold. If the system thermostat 3 has a single heat output, the output may be coupled via a jumper (not shown) to heat inputs 14 and 16 for proper single stage operation. Alternatively, the single heat output may be provided to either one of heat inputs 14 and 16. In cooling operations, the single-stage thermostat provides a single system thermostat signal at the cool input 18 and the cool input 20 when the temperature is above a threshold.

A dual stage thermostat provides a system thermostat signal comprised of a high signal and a low signal. In heating operations, the low signal is provided at the heat input 14 when the temperature is less than a first threshold. The high signal is provided at the heat input 16 when the temperature is less than a second lower threshold. Similarly, in cooling operations, the low signal is provided at the cool input 18 when the temperature is above a first threshold, and the high signal is provided at the cool input 20 when the temperature is above a second higher threshold.

The control 10 turns one or both of HVAC units 4 and 5 ON or OFF in response to the system thermostat signal from the system thermostat 3. The system thermostat 3 also provides a manual fan signal at manual fan input 22 for signaling the control 10 to turn ON or to force ON the fans 8 and 9 of the HVAC units 4 and 5, respectively. The system thermostat 3 generally includes a switch (not shown) for producing the manual fan signal.

The interconnection of the system thermostat terminals 11 to the system thermostat 3 is known. Also, the interconnection of the HVAC unit control terminals 30 to the HVAC unit 4 and the interconnection of the HVAC unit control terminals 31 to the HVAC unit 5 are known. The system thermostat terminals 11 and the HVAC unit control terminals 30 and 31 are standard terminals for devices used in HVAC systems. The alarm terminals 24 and 26 allow an alarm mechanism (not shown) to be coupled to the control 10. The ground input for the HVAC unit 5 is preferably not connected to the control 10.

Figure 2:
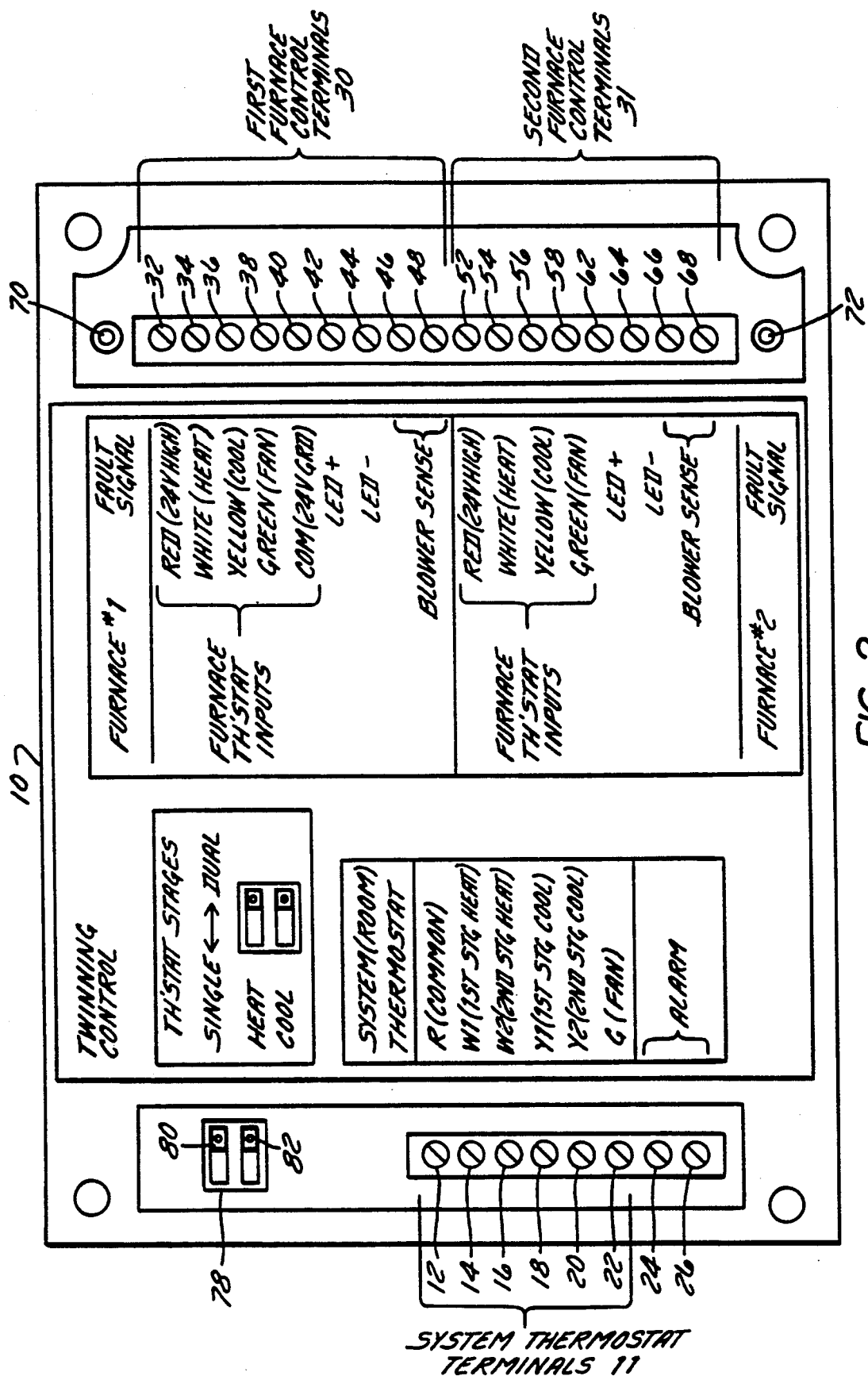
FIG. 2 is a schematic block diagram of the exemplary twinning control in accordance with the present invention.

FIG. 2 is a schematic block diagram of the control 10. The control 10 includes a stage switch 78. Stage switch 78 includes a first switch 80 for selecting single or dual mode heating operations and a second switch 82 for selecting single or dual mode cooling operations. The control 10 is operable in a single mode or dual mode for heating operations as set by the first switch 80, and is operable in a single or dual mode for cooling operations as set by the second switch 82. The first switch 80 and the second switch 82 are set according to the type of system thermostat 3 which is used.

An LED indicator 70 emits fault codes for the HVAC unit 4, and the LED indicator 72 emits fault codes for the HVAC unit 5. The control 10 causes the LED indicators 70 and 72 to emit fault codes when a malfunction in the HVAC system 2 is detected. These fault codes indicate to the user or service personnel whether a malfunction exists and the type of malfunction that exists. The control 10 stores the fault codes in memory. The fault codes stored in memory may be erased by cycling the system thermostat 3. For example, if the fan 8 in the blower 6 of the HVAC unit 4 is not operational, LED indicator 70 flashes a particular code indicating that the fan 8 is not operational.

LED terminals 42 and 44 provide inputs for the fault code which may be provided to the LED indicator 70. Similarly, LED terminals 62 and 64 provide inputs for the fault code which is provided at the LED indicator 72. The LED indicators 70 and 72 on the control 10 may also and display fault codes provided to the LED terminals 42 and 44 and the LED terminals 62 and 64 by an HVAC controller (not shown) located on the HVAC units 4 and 5. An indicator (not shown) for LED terminals 42 and 44 may also be provided on the HVAC unit 4 and an indicator (not shown) for the LED terminal 62 and 64 may also be provided on the HVAC unit 5.

Single Mode Operation

When in the single mode, the system thermostat 3 provides a single system thermostat signal for heating and a single system thermostat signal for cooling. When the system thermostat 3 determines that the temperature has fallen below a first threshold, the system thermostat 3 provides a system thermostat signal to inputs 14 and 16. The control 10 receives the system thermostat signal and provides heat signals at the heat output 34 and the heat output 54. The HVAC units 4 and 5 are turned ON in response to the heat signals.

When the HVAC units 4 and 5 are turned ON, the first and second HVAC units automatically turn ON the fans 8 and 9 in the blowers 6 and 7. However, due to start-up delay mechanisms and testing circuits, the fans 8 and 9 may not operate immediately after the HVAC units 4 and 5 are turned ON. The control 10 advantageously checks the status of the fans 8 and 9 in order to ensure efficient operation of the HVAC units 4 and 5. If the fan 8 is turning, the blower ON signal appears across blower sense inputs 46 and 48. If the fan 9 is turning, the blower ON signal appears across the sense inputs 66 and 68.

If the blower ON signals do not appear across both blower sense inputs 46 and 48 and blower sense inputs 66 and 68 within a predetermined time delay such as one second, the control 10 forces ON both fans 8 and 9 by providing the manual fan signals at the fan outputs 38 and 58. If fans 8 and 9 are detected ON within a predetermined delay such as a five second delay, the control 10 removes the manual fan signal after a 15 second delay. If both blower ON signals are detected, the control 10 continues normal operation.

If both blower ON signals are not detected within a predetermined time such as within 1 second of removing the manual fan signals, the control 10 repeats providing the manual fan signals at the fan outputs 38 and 58 for a predetermined time such as approximately five seconds for a number of repetitions such as five repetitions. If the control 10 does not sense that the fans 8 and 9 remain ON after removing the manual fan signals, the control 10 maintains the manual fan signals at the fan outputs 38 and 58 and activates an alarm signal at the alarm terminals 24 and 26. The control 10 continues to control the operable HVAC unit 4 or 5 so that it supplies heat to the temperature controlled environment.

If either fan 8 or 9 cannot be forced ON by the manual fan signal, the HVAC units 4 and 5 are turned OFF by removing the heat signals from the heat outputs 34 and 54 and the fans 8 and 9 are turned OFF by removing the manual fan signals from the fan outputs 38 and 58. The alarm terminals 24 and 26 may provide a signal to the alarm mechanism which indicates that either fan 8 or 9 is not operational.

When the system thermostat 3 determines that the temperature has risen above the heating threshold temperature, the system thermostat 3 removes the system thermostat signal from the heat inputs 14 and 16. In the absence of the system thermostat signal at the heat inputs 14 and 16, the control 10 removes the heat signals at the outputs 34 and 54 turning OFF HVAC units 4 and 5 and removes the manual fan signals from fan outputs 38 and 58 (if the fan signals were present).

Single mode cooling operations are similar to single mode heating operations. However, the system thermostat signal is provided at cool input 18 and cool input 20, and the twinning control provides the cool signals at the cool output 36 and the cool output 56. Also, in the event of a failure of either blower 6 or 7, the cool signals at the cool outputs 36 and 56 are removed if either or both fans 8 or 9 are not detected ON within five seconds after providing the cool signals. Also, the control 10 may activate the alarm mechanism at the alarm terminals 24 and 26.

Dual Mode Operation

In a dual heating or cooling mode of operation, the HVAC units 4 and 5 are operated as a two-stage system.

In a dual mode heating operation, the system thermostat 3 provides the low signal at the heat input 14 and the high signal at the heat input 16. When the control 10 receives a high signal from the system thermostat 3, the HVAC units 4 and 5 are both turned ON. When the control 10 receives a low signal, only one of the HVAC units 4 and 5 is turned ON. Control 10 operates to alternate the use of HVAC units 4 and 5 when only a low signal is produced so that HVAC units 4 and 5 are generally operated for equal periods of time.

The control 10 alternates which one of HVAC units 4 and 5 is turned ON when only a low signal is received from the system thermostat 3. For example, when the low and high signals are received at the heat inputs 14 and 16 respectively, the control 10 turns ON the HVAC units 4 and 5 by providing the heat signals at the heat output 34 and the heat output 54. If the temperature in the room rises above the first lower threshold, the system thermostat 3 removes the high signal at the heat input 16. In response to the absence of the high signal, the control 10 removes the heat signal from the heat output 54 and turns OFF the HVAC unit 5.

If the temperature falls below the first lower threshold, the system thermostat 3 provides the high signal to the heat input 16. The control 10 provides the heat signal at the heat output 54 in order to turn the HVAC unit 5 ON. When the temperature rises above the first lower threshold and the system thermostat removes the high signal from the heat input 16, the control 10 removes the heat signal from the heat input 34 and turns the HVAC unit 4 OFF. Thus, the control 10 advantageously increases the operational life of the HVAC units 4 and 5 by alternating between the HVAC units 4 and 5 when in the dual mode of operation.

When the temperature rises above the second higher threshold, the system thermostat 3 removes both the high and low signals from the heat input 16 and the heat input 14, respectively. The control 10 removes the heat signals from the heat outputs 34 and 54 in response to the absence of the high and low signals. The control 10 provides a fan signal at fan outputs 38 and 58 in order to hold the fans 8 and 9 ON for a predetermined time such as approximately two minutes.

As in the single mode of operation, the control 10 checks the status of the blowers 6 and 7. If the blower ON signals are not detected after turning ON HVAC units 4 and 5 and forcing ON fans 8 and 9 within 5 seconds, the control 10 turns OFF the HVAC units 4 and 5 and the fans 8 and 9 and activates the alarm output. Preferably, fault codes are flashed at the LED indicators 70 and 72. These codes may be stored in memory (not shown) in the twinning control.

The operation of a two-stage or dual mode cooling operation is generally the same as the dual mode heating operation. However, a delay period for running the fans in the blowers is not utilized. In the dual mode cooling operation, the system thermostat 3 provides a high signal at the cool input 18 and a low signal at the cool input 20.

Twinning Control Components

Figure 3:
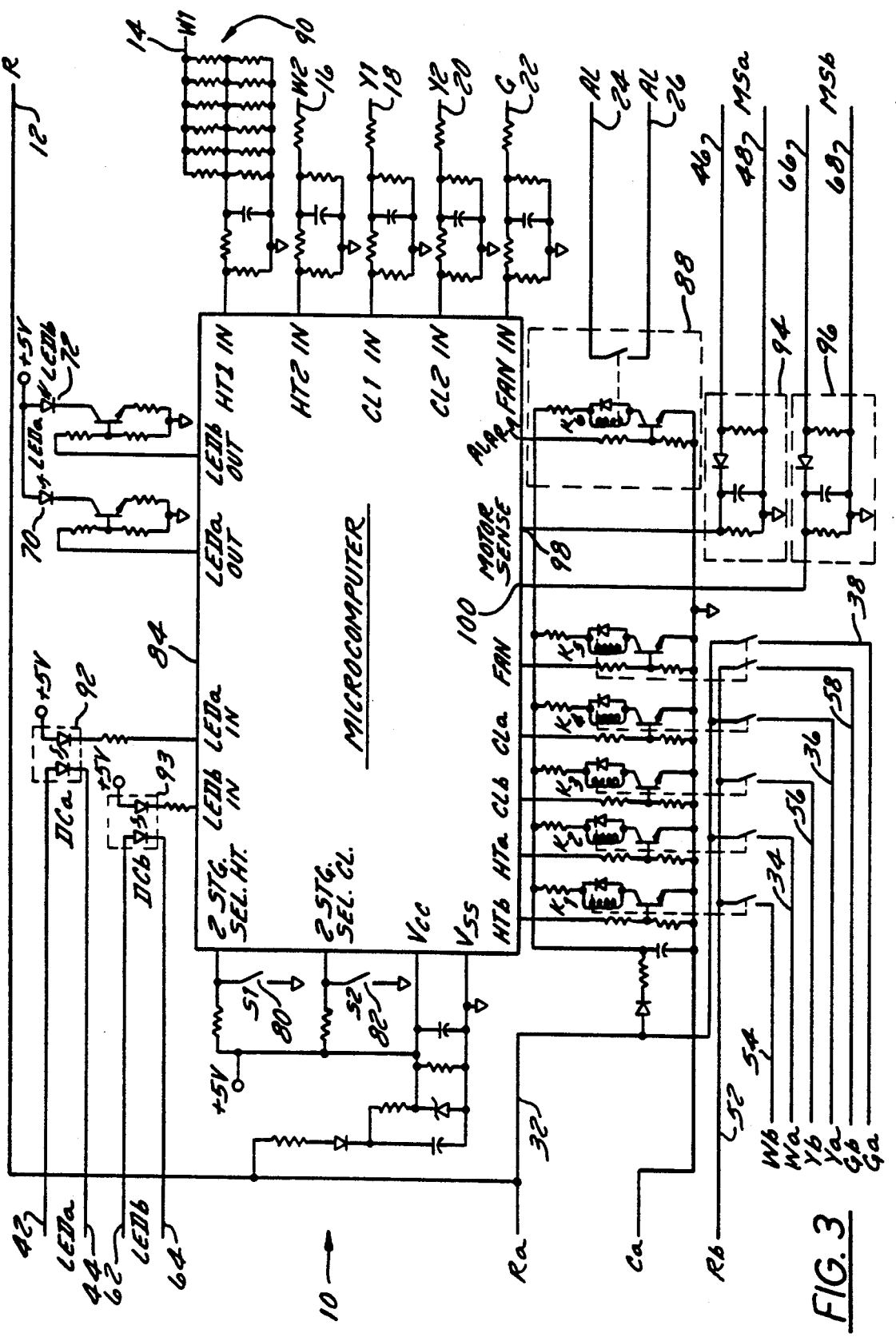
FIG. 3 is a more detailed schematic drawing of the exemplary twinning control in accordance with the present invention.

With reference to FIG. 3, a more detailed schematic diagram of the control 10 is shown in accordance with the preferred exemplary embodiment of the present invention. The components in FIG. 3 represent a preferred embodiment and do not limit the scope of the invention as recited in the claims. The control 10 is powered by the 24 V AC signal from the HVAC unit 4 at the 24 V AC terminal 32. The 24 V AC signal is provided to the system thermostat 3 at the 24 V AC terminal 12.

A digital computer such as microcomputer 84 provides the logic circuitry for controlling the operation of the control 10. Microcomputer 84 is a 5 VDC or 3.3 VDC integrated microcomputer or microprocessor running software implementing the operations described above. By way of example only, microcomputer 84 may be an 8-bit CMOS microcontroller such as a MC68HC05 made by Motorola.

An optocoupler circuit 92 between LED terminals 42 and 44 provides an isolated input for the microcomputer 84. Similarly, an optocoupler circuit 93 between LED terminals 62 and 64 provides an isolated input.

Preferably, the heat signals at heat outputs 34 and 54 are provided as 24 V AC signals by single pole, single throw normally open relays under the control of the microcomputer 84. The cool signals at the cool outputs 36 and 56 are provided as 24 V AC signals by single pole, single throw normally open relay switches under control of the microcomputer 84. Alternatively, the single pole, single throw switches may be replaced by double pole, single throw relay switches for low cost implementations. The resistors 90 coupled to the heat input 14 provide a shunt to tolerate and to supply charging current to an electronic set back thermostat (not shown). The fan signals at the fan outputs 58 and 38 are provided by a double pole, single throw normally open relay switch. An alarm circuit 88 utilizes a relay to control the alarm terminals 24 and 26.

A motor sense circuit 94 is preferably coupled to a current transformer (not shown) or other sensor situated proximate the fan 8 or otherwise coupled across the motor coil of the fan 8 in the blower 6. The motor sense circuit 94 provides a voltage at a microcomputer input 98 when the fan 8 is running. Similarly, a motor sense circuit 96 provides a voltage at a microcomputer input 100 when the fan 9 of the blower 7 is running. The sense circuits 94 and 96 may also provide high and low signals indicative of the speed of the blowers 6 and 7. Of course, various other blower sense circuits may be utilized as interface between the microcomputer 84 and the blowers 6 and 7.

It will be understood that, while various conductors/connectors are depicted in the drawings as single lines, they are not shown in a limiting sense and may comprise plural conductors/connectors as is understood in the art. Further, the above description is of a preferred embodiment of the present invention and is not limited to the specific form shown. For example, while various types of relay switches are shown, semiconductor switches may be utilized. Likewise, the twinning control could be programmed in various ways without departing from the spirit of the invention. By way of further examples, it may become practical to replace microcomputer 84 with other types of hardware and/or software for certain applications and/or based upon changes in technology.

We claim:

1. A control for use in temperature controlling system including a system thermostat, a plurality of blower sense circuits including a first blower sense circuit and a second blower sense circuit, and a plurality of HVAC units including a first HVAC unit including a first blower unit and a second HVAC unit including a second blower unit, said first blower sense circuit coupled to the first blower in said first HVAC unit and a second blower sense circuit coupled to the second blower in said second HVAC unit, the control for controlling said first HVAC unit and said second HVAC unit, the control comprising:

system thermostat input means for receiving first stage heating, and second stage heating input signals;

first blower sense input means for receiving a first blower signal from said first blower sense circuit;

second blower sense input means for receiving a second blower signal from said second blower sense circuit;

first output means for providing a first HVAC unit signal for said first HVAC unit;

second output means for providing a second HVAC unit signal for said second HVAC unit; and computer means for generating said first and said second HVAC unit signals in response to said first and said second blower signals and said first stage heating and said second stage heating input signals.

2. The control as recited in claim 1 further comprises alarm output means for providing an alarm signal and wherein said microcomputer generates said alarm signal if either of said first blower signal or said second blower signal indicate that either said first blower or said second blower is not operating.

3. The control as recited in claim 1, further comprising a first LED input means for receiving a flash code from said first HVAC unit;

a second LED input means for receiving a second flash code from said second HVAC unit; and wherein said microcomputer means stores said first flash code and said second flash code.

4. The control as recited in claim 3, further comprising a first LED indicator and a second LED indicator wherein said microcomputer means flashes said first LED indicator in response to said first flash code and said microcomputer means flashes said second LED indicator in response to said second flash code.

5. The control of claim 1, wherein said blower sense circuits include a current transformer.

6. The control of claim 1, further comprising a mode selector switch for manually selecting a mode.

7. The control of claim 1, wherein said first and second output means include relay switches.

8. The control of claim 1, wherein said first and second HVAC units are heating HVAC units.

9. The control of claim 1, wherein said first and second HVAC units are cooling HVAC units.

10. The control of claim 1, wherein said first and second HVAC units include heating and cooling HVAC units.

11. The control of claim 1, further comprising:

first and second manual fan output means for providing signals to said first and second HVAC units for turning said first and second blowers ON.

12. The control of claim 1, wherein the first and second blower signals include high and low signals.

13. A control for use in a system including a system thermostat, and a plurality of HVAC units including a first HVAC unit and a second HVAC unit, the control for controlling said first HVAC unit and said second HVAC unit, the system further including a first blower, a second blower, a first blower sense circuit which provides a first blower ON signal indicating the state of the first blower and a second blower sense circuit which provides a second blower ON signal indicating the state of the second blower, the control comprising:

a stage input which receives a stage signal representing one of a dual mode and a single mode;

system thermostat input which receives a system thermostat signal, the system thermostat signal being comprised of either a high and a low signal in the dual mode, or a single system thermostat signal in the single mode;

a first output which provides a first HVAC unit signal;

a second output which provides a second HVAC unit signal;

a first blower sense input which receives the first blower ON signal;

a second blower sense input which receives the second blower ON signal;

a first fan output which provides a first fan signal;

a second fan output which provides a second fan signal; and a logic circuit, coupled to the stage input, the first output and the second output, configured to provide the first and second HVAC unit signals in response to the high and low signal and provides one of the first and second HVAC unit signals in response to the lower HVAC unit signal and an absence of the high HVAC unit signal when in the dual mode, and provides the first and second output signals in response to a single system thermostat signal when in the single mode, and wherein the logic circuit provides the first fan signal if a blower ON signal is not received within a predetermined amount of time after providing the first HVAC unit signal, and provides the second fan signal if the second blower ON signal is not received within a predetermined amount of time after the second HVAC unit signal is provided.

14. The control of claim 13 further comprising an alarm output for providing an alarm signal; and wherein the logic circuit provides the alarm signal if the first blower ON signal is not received within a predetermined amount of time after the first fan signal is provided.

15. The control of claim 13 wherein the logic circuit is a microcomputer.

16. The control of claim 13 wherein the first and second outputs are coupled to relay switches.

17. The control of claim 13 wherein the first and second HVAC units are boilers.

18. In a temperature controlling system including a first HVAC unit having a first blower, a second HVAC unit having a second blower, a first blower sense circuit coupled to the first blower which provides a first blower ON signal, a second blower sense circuit coupled to the second blower which provides a second blower ON signal, and a twinning control coupled to the first and second blower sense circuits, the twinning control providing a first HVAC unit signal for turning ON the first HVAC unit, a second HVAC unit signal for turning ON the second HVAC unit, a first blower signal for forcing ON the first blower, and a second blower signal for forcing ON the second blower, a method for controlling the first and second HVAC units comprising the steps of:

providing the first and second HVAC unit signals; and providing at least one of the first and second blower signals if the first and second blower ON signals are not sensed within a first predetermined time.

19. The method of claim 18, further comprising:

removing the at least one of the first and second blower signals after the first and second blower ON signals are sensed.

20. The method of claim 19, further comprising:

providing the at least one of the first and second blower signals if the first and second blower ON signals are not sensed within a second predetermined time; and removing the at least one of the first and second blower signals after the first and second blower ON signals are sensed.

21. The method of claim 20 wherein the twinning control includes an alarm, further comprising:

repeating the steps recited in claim 18 for a given number of times and after the given number of times, maintaining the first and second blower signals and activating the alarm.

22. The method of claim 18, further comprising:

removing the first and second HVAC unit signals and first and second blower signals if the first and second blower ON signals are not sensed within a second predetermined time.

23. The method of claim 22 wherein the twinning control includes an alarm, further comprising:

activating the alarm.

* * * * *